US006927693B2

(12) United States Patent
Marmaropoulos et al.

(10) Patent No.: US 6,927,693 B2
(45) Date of Patent: Aug. 9, 2005

(54) PORTABLE SIGNAL ACTIVATOR ASSEMBLY

(75) Inventors: George Marmaropoulos, Thessaloniki (GR); Clive van Heerden, London (GB)

(73) Assignee: Koninklijke Philips Electronics, N.V., Eindhoven (NL)

( * ) Notice: Subject to any disclaimer, the term of this patent is extended or adjusted under 35 U.S.C. 154(b) by 96 days.

(21) Appl. No.: 10/043,379

(22) Filed: Oct. 26, 2001

(65) Prior Publication Data

US 2003/0080870 A1 May 1, 2003

(51) Int. Cl.⁷ .............................................. G08B 23/00
(52) U.S. Cl. .................... 340/573.1; 340/691.1
(58) Field of Search ........................ 340/573.1, 573.6, 340/984, 539, 539.1, 539.11, 691.1; 381/90

(56) References Cited

U.S. PATENT DOCUMENTS

| 4,539,700 A | * | 9/1985 | Sato | 381/333 |
| 4,603,327 A | * | 7/1986 | Leonard et al. | 340/573 |
| 4,860,364 A |   | 8/1989 | Giannini | 381/90 |
| 5,690,411 A | * | 11/1997 | Jackman | 362/103 |
| 5,757,929 A |   | 5/1998 | Wang et al. | 381/24 |

FOREIGN PATENT DOCUMENTS

WO    WO0167723    9/2001    ............ H04M/1/00

* cited by examiner

Primary Examiner—Anh V. La

(57) ABSTRACT

A wearable garment, usable by athletes, workers, and the elderly or infirm, incorporates an easily operated manual activator/switch located in a readily accessible position on the garment. A user wearing the garment can operate the switch by merely touching the appropriate location on the surface of the garment. The switch is electrically coupled to a signaling device, such that operation of the switch activates the signaling device to transmit a signal or signals for summoning help or identifying the geographic location of the bearer of the signaling device, or otherwise assisting the bearer. Pockets and/or other forms of support on the garment can be provided to assist in carrying signaling devices coupled to the switch as well as ancillary equipment such as power supplies. The switch can be incorporated into and enclosed within the structure of the garment to protect it from ambient conditions such as moisture or dust, and conductors or other cables can be made to extend outside the exterior of the garment structure so as to facilitate interconnection of the activator switch with necessary related equipment.

10 Claims, 1 Drawing Sheet

PORTABLE SIGNAL ACTIVATOR ASSEMBLY

BACKGROUND OF THE INVENTION

1. Field of the Invention

This invention relates to portable emergency signaling equipment intended to permit carriers of the equipment to call for help when needed. More specifically, the invention relates to a signal activator assembly, that can be worn as a garment by person such as an athlete, for example, having an electrical activator switch incorporated into the garment in a location or locations most conveniently accessible to the wearer.

2. Description of the Invention

Portable signaling devices for use by workers, athletes and the elderly or infirm, are deemed to be well-known in the art. It is also well-known that such signaling devices may be used for notifying others of an emergency situation. However, to the best of the current inventors' knowledge, the prior art devices do not address the problem of assuring that the activator for such signaling devices is consistently positioned so as to be conveniently accessible to a person in need.

In the prior art, portable signaling activators such as emergency alarm buttons have often been carried as self-contained units at the end of lanyard cords hung about the neck. Such signaling buttons suffer from the disadvantage of imposing added weight and possible abrasion of tender skin areas on those most vulnerable to the ill-effects of such impositions. Although these lanyard-mounted signaling buttons can be located advantageously away from exposure to undesirable ambient weather conditions such as rain and snow, such positioning does not place them in particularly advantageous orientation for emergency access. Further, lanyard supports are not readily usable by athletes and other physically active persons, because physical activity tends to dislodge any object suspended on the lanyard and may often result in the object being out of reach of the wearer when the need for access to the object arises.

Another form of portable signaling apparatus involves reliance on hand held cell phones with "dedicated" push buttons that transmit signals or calls to emergency numbers such as "911", or other pre-selected help or service providers. However, cell phones and similar hand-carried devices are subject to inadvertent misplacement and/or to being inaccessible in deep pockets or overfilled handbags at the moment of greatest need.

The present invention overcomes these problems and limitations of the prior art by incorporating a signal operator, such as a pressure-sensitive, momentary-contact pad switch, in a protected but readily accessible location in the structure of a wearable garment or band.

SUMMARY OF THE INVENTION

The present invention discloses a wearable garment such as an athletic "sweat suit", having a pressure-sensitive pad switch mounted to the body of the garment in a convenient, readily accessible location. If the garment is of a different form, such as a wrist band for example, having the switch/activator incorporated into the band, a person in need of signaling for help, would have to do no more than merely touch one hand to the wrist of the other to cause a connected device to transmit an appropriate signal. More generally, the activator can be incorporated into any conveniently accessible location on the body of a more conventional wearable garment such as, merely for example, a shirt, jacket, skirt or trousers, chest, arms and hips might be highly desirable locations for location of an activator in accordance with this invention.

The signaling garment of this invention incorporates pressure sensitive pad switches of a type well-known in the art that are readily available in various conventional forms, for this purpose. Portable signal transmitting devices usable with this invention are similarly well-known in the art, and many already carry connection means or devices such as electrical connectors for coupling an activator switch capable of initiating the transmission of a specific, desired "help" signal.

In accordance with this invention, a garment of desired form and function, may be constructed in conventional manner using readily available fabrics and materials, and the switch/activator may be positioned advantageously within a waterproof or otherwise protected enclosure that permits easy activation by pressure or touch transmitted through the garment material. In addition, the garment may be provided with pockets or other accessible enclosures for carrying and readily removing necessary ancillary equipment such as the signaling device itself, and/or primary or auxiliary battery packs to power the signaling device. Needed connection cables or cords can extend from the activator, through the material of the garment, for connection to the signaling device or power supply, if they are not associated directly with the activator.

These and other and further features and advantages of this invention will be made more apparent to those having skill in this art, by reference to the following specification considered in conjunction with the accompanying drawings, in which:

DETAILED DESCRIPTION OF THE DISCLOSED EMBODIMENT

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 1:
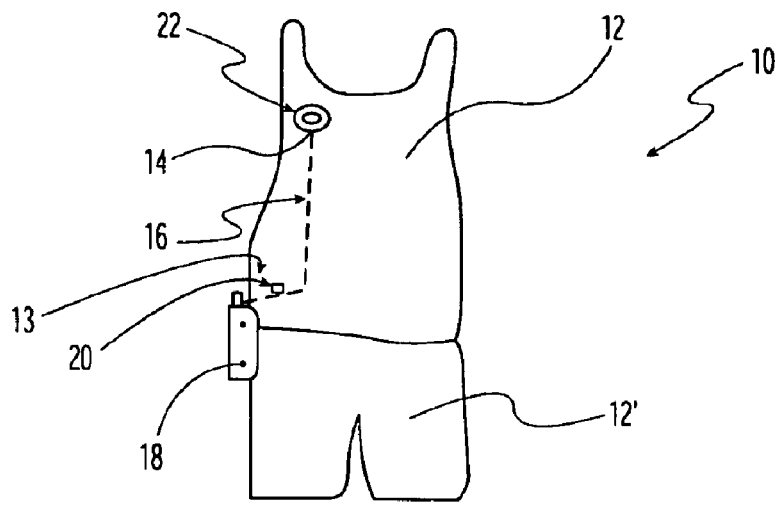
FIG. 1 is a front elevation view showing one embodiment of a portable signal activator assembly in accordance with this invention, set up for use.

Referring now to FIG. 1 of the drawings, a portable signal activator 10 in accordance with this invention may be seen to comprise a wearable garment 12 having a pressure-sensitive switch 14 mounted thereon in a location conveniently accessible to a wearer of the garment. In the embodiment illustrated in FIG. 1, the wearable garment 12 has the form of a conventional sleeveless athletic tank top shirt, although it will be understood readily that the shirt alternatively may be either long-sleeved, short-sleeved, for example. For a shirt-like garment, the location of the switch, as shown, may slightly inward and below the shoulder of the wearer, where it can be reached easily by most wearers, by simply reaching up to the left or right shoulder with either the corresponding arm or the opposing arm.

Figure 2:
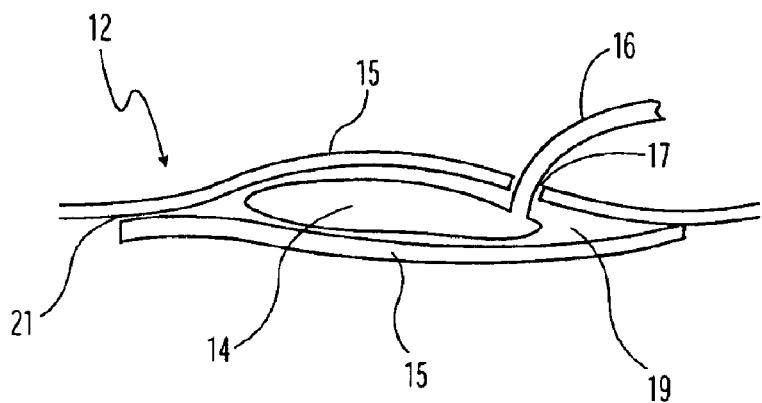
FIG. 2 is a partial section view, showing a detail of the construction of the portable signal activator assembly of FIG. 1.

Relatively thin, light-weight, pressure-sensitive, "pad-type" electrical switches suitable for incorporation into assemblies in accordance with this invention, are well-known in the art and are readily available in the marketplace. Switches of any type used in accordance with this invention may be expected to have conductors, capacitance, resistive type switches or cables of some type extending from the switch structure for connection to ancillary equipment such as a signaling device and/or electrical power supply (such as a battery) or both. In FIG. 1 of the drawings, switch 14 may be seen to have a cable 16 extending therefrom, with the cable being coupled to an ancillary cell phone or other signaling device 18. Cable 16 extends from the switch 14, through the material fabric of garment 14 if necessary when, for example, the switch is enclosed within a double-walled enclosure as illustrated in FIG. 2 of the drawings. In FIG. 2, two layers 15 of the fabric of garment 12 may be joined together to define the periphery 21 of an enclosure 19 for securing and sealing the switch 14 to garment 12. The two joined together layers 15 may be made water-resistant or water-proof in the area forming the enclosure 19 to provide additional protection for the enclosed switch 14. Still further protection may be provided by similarly sealing the peripheral edge 21 surrounding switch 14. If necessary, the passage of cable 16 through an opening 17 in the fabric 15 may be made water-resistant also, in any well-known manner, to enhance the protection of the switch 14 within its enclosure. Although cable 16 is shown in FIG. 1 to be coupled to garment 12 via a mechanical clip device 20, it will be understood that any suitable form of attachment may be used if desired, or at least a portion of the length of cable 16 may be allowed to hang loose, free of attachment.

FIG. 1 of the drawing further illustrates another feature of this invention, in that the location of the switch 14 on the garment 12 is made readily apparent by indicia such as the printed symbol 22 on the surface of the garment. In this form, the indicia is in visible form, but the location may be made evident, also, if desired, by tactile indicia in the form of a molded or embossed attachment properly positioned on the garment.

To facilitate use of the signal activator of this invention, it should be noted that garment 12 or a coordinated accessory garment such as athletic shorts 12' shown in FIG. 1, may be provided with a support or supports 13 in the form of loops, hooks (as shown in FIG. 1), pockets, or other receptacles or carrying means to receive or otherwise engage equipment considered ancillary to switch 14, such as cell phone 18. Such ancillary equipment may be used in conjunction with switch 14 for transmitting the desired signals to a remote receiver, in any well-known manner, once the signaling device has been activated through use of switch 14. It is well-known that ancillary equipment of this type, currently available, often includes provision for connection of remote switches for activating dedicated functions such as dialing the emergency number "911" from a cell phone. Adapters for connection of remote activator switches can be fitted readily, using well-known techniques, to such ancillary equipment in any case where it is required and not already available. In this regard, it should be noted that ancillary equipment may not be needed at all if suitable signal-transmitting equipment is integrated with switch 14 and mounted to garment 12 together with the switch.

Locating and securing such switches in proper position on garments formed of ordinary garment materials can be accomplished easily using well-known sewing and or other fabric-attachment techniques. The materials of such garments may be either natural or synthetic, and the fabric created from such materials may be either woven or sheet-formed in any well-known manner.

Figure 3:
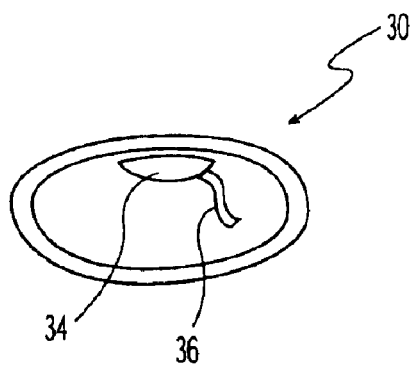
FIG. 3 is a simplified view of another embodiment of a portable signal activator assembly in accordance with this invention.

FIG. 3 illustrates an alternative embodiment of this invention showing a garment in the form of a simple wrist band 30 having a pressure-sensitive switch 34 mounted to the band, with a cable 36 extending from the switch for connection to any related ancillary equipment. In this embodiment, a wearer can access the switch 34 readily by merely touching one hand to the proper site on the band on the opposed wrist. It will be understood readily by those having skill in this art, that in this embodiment of the invention, any connecting cable 36 extending from the wrist band can be coupled without difficulty to an ancillary device such as a cell phone, radio, pager, GPS device or other signal transmitter, carried anywhere on the person of the wearer of the band.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A portable signal activator comprising:
   a wearable garment having a body structure;
   a pressure-sensitive electrical activator switch mounted to the body structure of said garment and capable of activating a removable signaling device to signal a remote receiver; and,
   a connection means extending from the electrical activator switch through a material fabric of the wearable garment to serve as a coupling to the removable signaling device.

2. The portable signal activator of claim 1, wherein said body structure of said garment includes at least a portion formed of two layers of material.

3. The portable signal activator of claim 2, wherein said pressure-sensitive electrical activator switch is enclosed between said two layers of material of said body structure.

4. The portable signal activator of claim 3, wherein said two layers of material define a moisture-resistant enclosure for said pressure-sensitive electrical activator switch.

5. The portable signal activator of claim 1, further comprising indicia on the outer surface of said wearable garment identifying the location of said activator switch.

6. The portable signal activator of claim 1, further comprising receptacles on the outer surface of said garment configured for engaging and supporting units ancillary to transmitting electronic signals.

7. A method for permitting a person to activate a portable removable signaling device to signal a remote receiver conveniently, said method comprising the steps of:
   coupling a pressure-sensitive activator switch to said removable signaling device for signaling the remote receiver through a material fabric of a wearable garment;

mounting both the removable signaling device and said switch to a wearable garment;

dressing said person in said wearable garment; and, positioning said switch on said garment within easy reach of said person wearing said garment.

8. The method of claim 7, further comprising the step of enclosing said activator switch between two layers of material.

9. The method of claim 7, wherein said garment bears tangible indicia on the outer surface thereof to identify the location of said switch, readily, to said wearer.

10. The method of claim 7, further comprising the step of protecting said switch from ambient conditions by enclosing it in a moisture resistant enclosure on said garment.

* * * * *